(No Model.)
J. L. INGERSOLL.
SULKY CULTIVATOR.
No. 360,300. Patented Mar. 29, 1887.
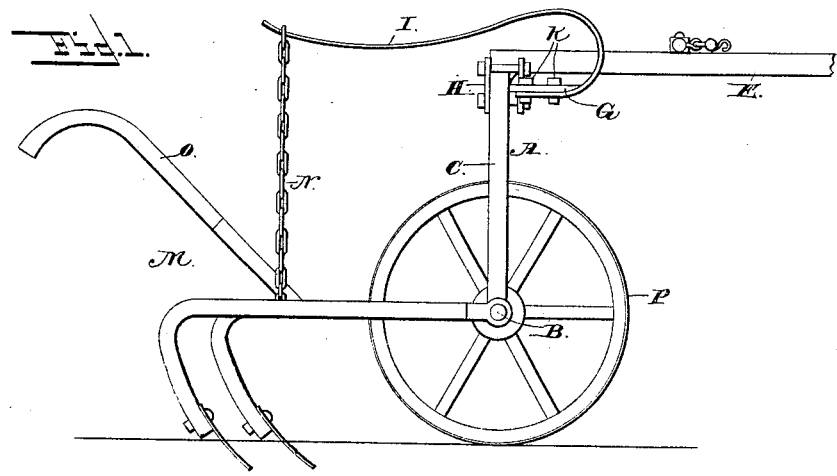
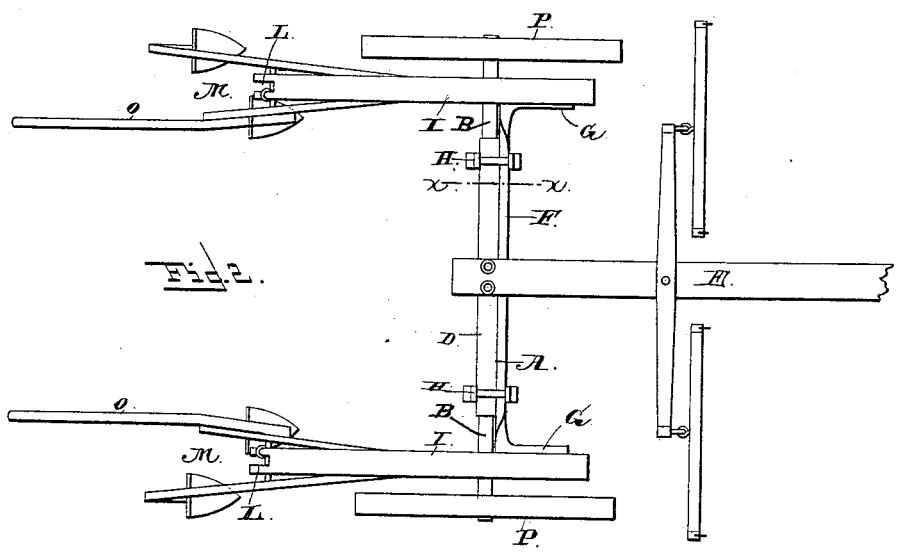
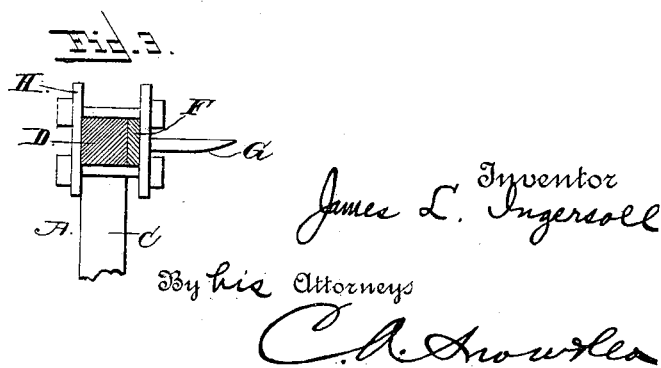
Witnesses
M. E. Fowler
J. W. Garner
Inventor
James L. Ingersoll
By his Attorneys
C. A. Knowles

UNITED STATES PATENT OFFICE.

JAMES LYMAN INGERSOLL, OF FOREST CITY, ILLINOIS.

SULKY-CULTIVATOR.

SPECIFICATION forming part of Letters Patent No. 360,300, dated March 29, 1887.

Application filed December 13, 1886. Serial No. 221,426. (No model.)

*To all whom it may concern:*

Be it known that I, JAMES LYMAN INGERSOLL, a citizen of the United States, residing at Forest City, in the county of Mason and State of Illinois, have invented a new and useful Improvement in Sulky-Cultivators, of which the following is a specification.

My invention relates to an improvement in sulky-cultivators; and it consists in the peculiar construction and combination of devices, that will be more fully set forth hereinafter, and particularly pointed out in the claims.

In the drawings, Figure 1 is a side elevation of a sulky-cultivator embodying my improvements, with the near wheel removed. Fig. 2 is a top plan view of the same. Fig. 3 is a detailed sectional view taken on the line $xx$ of Fig. 2.

A represents an arched axle, having the horizontal spindles B, the vertical arms C, and the horizontal yoke D, connecting the upper ends of the said arms.

E represents the tongue, which has its rear end attached to the center of the yoke, the said tongue having the usual whiffletree and single-trees for the attachment of the draft-animals.

F represents a metallic bar, which has its ends turned at right angles, flattened, and projecting from the front side of the bar to form ears G. This bar F is clamped to the front side of the yoke by means of suitable clips, H.

I represents a pair of curved springs, which have their front ends rounded and secured to the under sides of the ears G by means of bolts K. The rear portions of the springs form spring-arms, which extend rearwardly beyond the axle and are arranged over the spindles thereof. Open slots L are made in the rear ends of the spring-arms.

M represents a pair of cultivators, which are here shown as of the double-shovel variety, but which may be made in any preferred form. The front ends of the beams of the cultivators are pivoted on the spindles of the axles, and the central portions of the beams of the cultivators are connected directly to the rear ends of the spring-arms by means of chains N. Each cultivator is provided with a single handle, O, so that the plowman, walking in rear of the sulky, can grasp one of the handles with each hand, so as to direct the cultivators. On the spindles B, outside of the front ends of the cultivator-beams, are pivoted the usual supporting-wheels, P.

The operation of my invention is as follows: When the machine is in motion, the springs take the draft entirely from the front ends of the cultivator-beam, and this counteracts the usual tendency of the cultivators to run too deeply in the ground, and also enables the said cultivators to be more readily managed and directed by the plowman. The springs also serve to cause the cultivators to trail in a straight line behind the sulky and prevent the cultivators from moving laterally and dodging the rows. By providing the spring-arms with the open slots, the chains which connect the cultivator-beams to the spring-arms may be vertically adjusted in the latter, so as to regulate the depth at which the cultivating-shovels shall work. The spring-arms move in a vertical plane at their outer free ends.

Having thus described my invention, I claim—

1. In a cultivator, the combination, with the arched axle, of the bar secured to the yoke of the axle and having its opposite ends projected past the vertical arms of the axle, the spring-arms secured to the ends of said bar, and the cultivators having their beams pivotally supported upon the spindles of the arched axle, the ends of the spring-arms being connected with the cultivator-beams, substantially as set forth.

2. In a sulky-cultivator, the combination of the arched axle, the bar F, secured to the yoke and having its ends projected forward past the yoke and over the spindles of the axle, the flat spring-arms secured to the ends of the said bar and extending rearwardly therefrom, and the cultivators having their beams pivoted to the axle, the free ends of the spring-arms being connected with the cultivator-beams, substantially as specified.

In testimony that I claim the foregoing as my own I have hereto affixed my signature in presence of two witnesses.

JAMES LYMAN INGERSOLL.

Witnesses:
 JOHN C. BEALE,
 D. C. BEALE.